United States Patent [19]

Swanson

[11] 3,925,472
[45] Dec. 9, 1975

[54] PHENOLIC OXIMES

[75] Inventor: Ronald R. Swanson, New Hope, Minn.

[73] Assignee: General Mills Chemicals, Inc., Minneapolis, Minn.

[22] Filed: Nov. 21, 1973

[21] Appl. No.: 417,915

Related U.S. Application Data

[63] Continuation of Ser. No. 709,801, March 1, 1968, abandoned, which is a continuation-in-part of Ser. No. 498,121, Oct. 19, 1965, abandoned.

[52] U.S. Cl. ........... 260/566 A; 75/117; 260/429 C; 260/438.1
[51] Int. Cl.² ............................... C07C 131/00
[58] Field of Search ............................ 260/566 A

[56] References Cited
FOREIGN PATENTS OR APPLICATIONS
799,742   8/1958   United Kingdom ............ 260/566 A

OTHER PUBLICATIONS

Blatt, J. Org. Chem., Vol. 20, pp. 591–602 (1955).

Primary Examiner—Gerald A. Schwartz
Attorney, Agent, or Firm—Gene O. Enockson; Patrick J. Span

[57] ABSTRACT

Saturated aliphatic and ethylenically unsaturated substituted 2-hydroxy benzophenoximes containing a total of from 3–25 carbon atoms in the aliphatic groups. Also compositions comprised of combinations of these benzophenoximes with certain α-hydroxy aliphatic oximes. Compounds and compositions are useful for the extraction of metal values.

14 Claims, No Drawings

PHENOLIC OXIMES

This is a continuation of application Ser. No. 709,801, filed on Mar. 1, 1968, now abandoned, which is in turn a continuation-in-part of application Ser. No. 498,121, filed Oct. 19, 1965, now abandoned.

The present invention relates to substituted benzophenoxime compounds which are useful for the extraction of metal values, such as copper, vanadium, molybdenum, etc., from aqueous leach liquors. The compounds of the present invention have the following formula:

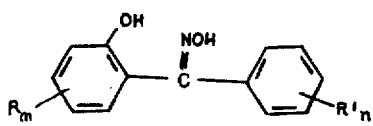

in which R and R' may be individually alike or different and are saturated or ethylenically unsaturated aliphatic groups and $m$ and $n$ are 0, 1, 2, 3 or 4 with the proviso that $m$ and $n$ are not both 0. The total number of carbon atoms in $R_m$ and $R'_n$ is from 3–25. R and R' contain 1 to 25 carbon atoms when saturated aliphatic and 3 to 25 carbon atoms when they are ethylenically unsaturated groups. Preferably, the position ortho to the phenolid OH substituted carbon atom is unsubstituted and also preferably the positions ortho to the oxime carbon atom on the other aromatic nucleus are unsubstituted. Branched chain saturated aliphatic hydrocarbon substituents are preferred. Compounds coming within the scope of the invention include the following:

2-Hydroxy-3'-methyl-5-ethylbenzophenoxime
2-Hydroxy-5-(1,1-dimethylpropyl)-benzophenoxime
2-Hydroxy-5-(1,1-dimethylethyl)-benzophenoxime
2-Hydroxy-5-octylbenzophenoxime
2-Hydroxy-5-nonyl-benzophenoxime
2-Hydroxy-5-dodecyl-benzophenoxime
2-Hydroxy-2',4'-dimethyl-5-octylbenzophenoxime
2-Hydroxy-2',3',5'-trimethyl-5-octylbenzophenoxime
2-Hydroxy-3,5-dinonylbenzophenoxime
2-Hydroxy-4'-(1,1-dimethylethyl)-5-(2-pentyl)-benzophenoxime
2-Hydroxy-4'-(1,1-dimethylethyl)-5-(2-butyl)-benzophenoxime
2-Hydroxy-4'-(1,1-dimethylethyl)-5-methylbenzophenoxime
2-Hydroxy-4',5 bis(1,1-dimethylethyl)-benzophenoxime As indicated from the above representative compounds, various alkyl groups can be used as R and R'. And as set forth above, such groups may be branched or straight chain. Various ethylenically unsaturated groups can also be used as R and R' and the same may be branched or straight chain. Representative of such groups are pentenyl, hexenyl, octenyl, decenyl, dodecenyl, octadecenyl and the like. It is preferred that such groups contain less than about 2 double bonds and more preferably a single double bond. Additionally the R and R' groups may contain inert substituents such as halogen, ester, amide, and the like. Likewise, the aromatic nuclei can contain inert substituents. By inert is meant that the said substituents do not affect the solubility, stability or extraction efficiency of the compounds to any significant extent.

The compounds of the present invention may be made by any of a variety of classical synthesis routes. These routes involve the formation of the benzophenone from known starting materials followed by the conversion of the benzophenone to the benzophenoxime. Two suitable methods of making the benzophenone include the following: One such method is that reported by Newman (J. Org. Chem., 19, 985–1002 (1954). This method involves the reaction of a phenol with a benzotrichloride in accordance with the following equation:

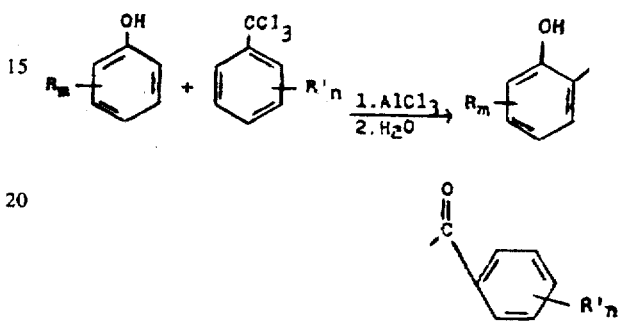

A second method involves the rearrangement where a phenolic ester is rearranged to a benzophenone in accordance with the following equation:

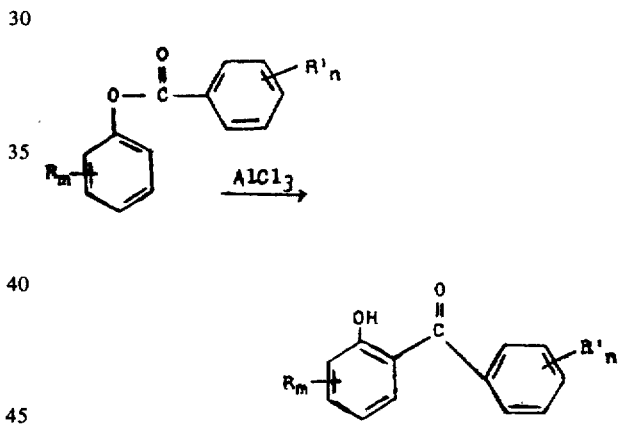

Typical commercially available p-substituted alkyl phenols which may be used in these methods include the following:

sec-butylphenol
tert-butylphenol
2,4-di-tert-butylphenol
octylphenol
nonylphenol
2,4-dinonylphenol
dodecylphenol
amylphenol Representative of other starting phenols are those having the following groups in the para position:

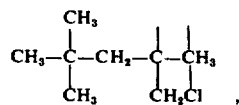

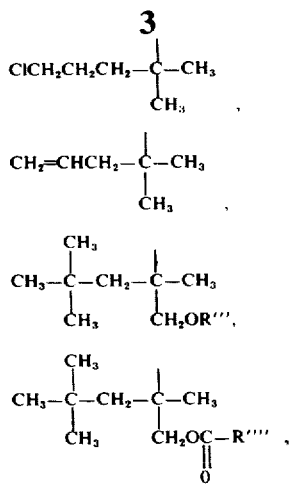

and the like where R''' and R'''' are alkyl groups of 1 to about 8 carbons for example. Of the two methods described above for the preparation of the benzophenones, the first is preferred as the second involves some side reactions which reduce yields.

A third method of producing compounds of this type is illustrated in the following sequence:

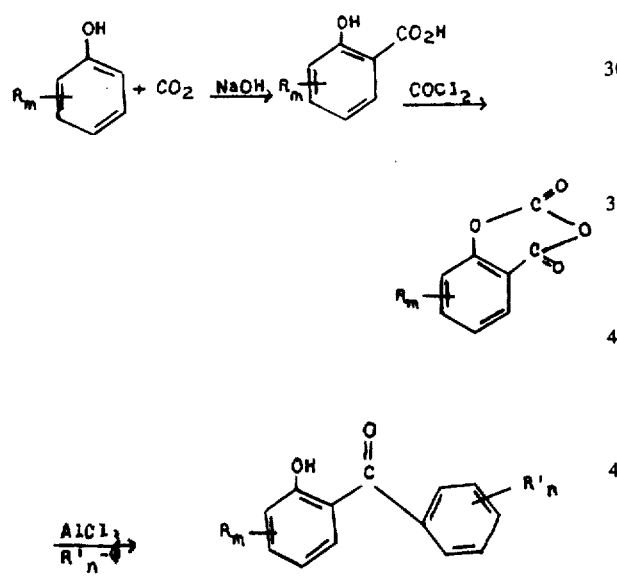

The benzophenoxime compounds of the present invention are prepared from the described benzophenones by reaction of the latter with a hydroxylamine salt under reflux conditions. Such reaction can be carried out by refluxing the reactants in an alcohol such as methanol or ethanol and adding pyridine or sodium acetate to combine with the acid associated with the hydroxylamine.

The particular method which may be employed to produce the extractant may depend upon the particular compounds available as starting materials and the efficacy of the particular method as applied to such starting materials. However, all of the compounds covered by the present invention may be produced by one or more of these methods in combination with classical synthesis methods which may be used for the preparation of starting materials for the final reactions.

As indicated above, the compounds of the present invention are useful for the extraction of copper and other metals from aqueous solutions. In this recovery process, the benzophenoxime dissolved in a solvent is contacted with the aqueous metal solution to form a complex of the metal and the benzophenoxime, which is soluble in the organic solvent. The organic phase is then separated from the aqueous phase and the metal stripped from the organic phase, usually by means of an acid.

The water immiscible solvents usually employed for this purpose are the aliphatic hydrocarbon solvents such as the petroleum-derived liquid hydrocarbons, either straight chain or branched, such as kerosene, fuel oil, etc. Various aromatic solvents may also be used, such as benzene, toluene, xylene and other aromatic solvents, for example, those derived from petroleum processing which may contain alkyl substituted aromatic materials. Typical of the latter solvents are those sold under the Panasol trademark by Amoco Chemicals Corporation, both in the "Rx" and the "AN" series. These solvents are liquid and essentially insoluble in water. Generally, all these hydrocarbon solvents have specific gravities in the range of 0.65–0.95 and have a mid-boiling point in the approximate range of 120°–615°F. (ASTM Distillation). In addition to the simple hydrocarbon solvents, the chlorinated hydrocarbons may also be used and in some instances may improve solubility. Accordingly, both the unsubstituted and the chlorinated solvents are contemplated by the term "liquid hydrocarbon".

The benzophenoximes of the present invention are further characterized as having sufficient solubility in one or more of the above solvents or mixtures thereof to make about a 2% solution and which are essentially insoluble or immiscible with water. At the same time, the benzophenoxime should form a complex with the metal, such as copper, which complex, likewise, is soluble in the organic solvent to at least the extent of about 2% by weight. These characteristics are achieved by having alkyl or ethylenically unsaturated substituents on either ring. It is necessary to have substituents which total at least 3 carbon atoms. This minimum may be obtained by means of a total of 3 methyl groups distributed on either one or on the two rings, by means of a methyl and an ethyl group, by means of a propyl group, etc. Usually it is preferred not to have more than 25 carbon atoms total in the substituents since these substituents contribute to the molecular weight of the oxime without improving operability. Large substituents, therefore, increase the amount of oxime for a given copper loading capacity. In general, the branched chain alkyl substituents effect a greater degree of solubility of the reagent and of the copper complex and, accordingly, these are preferred.

The following examples will illustrate the preparation of typical benzophenoximes of the present invention and also the process of effecting the extraction using such compounds. It is to be understood, however, that these examples are illustrative only and not as limiting the invention. Unless otherwise indicated, all parts are by weight.

EXAMPLE I

1. Preparation of 2-Hydroxy-5-nonylbenzophenoxime

Seven hundred fifty parts ethylene dichloride and 103 parts powdered aluminium chloride were charged to a glass-lined reactor equipped with an HCl scrubbing system. After cooling the above materials to −37°C., a mixture of 178 parts nonylphenol (available from Jefferson Chemical Company Inc.— the nonylphenol comprises a mixture of monoalkyl phenols, predominantly para substituted, with the chains being random-branched alkyl radicals) and 108 parts ethylene dichloride was pumped into the same over a period of 23 minutes. The pump and lines were rinsed with 20 parts ethylene dichloride at which point the reaction mixture had a temperature of −35°C. After 10 minutes, 140 parts benzotrichloride were pumped into the reaction mixture over a 10 minute period and the pump and lines were again rinsed with 20 parts ethylene dichloride. The reaction mixture temperature was then −23°C. After allowing the materials to react for 15 minutes, 120 parts of methanol were pumped into the same over a 20 minute period. The temperature rose to 9°C. at which time 200 parts water were added. The reactor was then opened and an additional 560 parts (approximately) of water were added at which point the reaction mixture had a temperature of 24°C. The water layer was siphoned off the top and approximately 920 parts more water was added as a second wash. After about 1 hour, the water layer was again siphoned off. At this point, 280 parts more water and 30 parts sodium hydroxide flakes were added to the reaction mixture. The resulting admixture was heated with steam to distill off the ethylene dichloride (a pot temperature of 101°C. was reached over a period of about 5 hours). Distillation was stopped, cooling was applied to the reactor and when the temperature reached 63°C., 300 parts n-hexane were added. After the addition of the n-hexane, the temperature was 38°C. The mixture was allowed to separate for 50 minutes and then the water layer was drained out of the bottom. Two hundred eighty parts water and 6 parts sodium hydroxide flakes were added to the hexane solution with agitation for one minute at 38°C. The admixture was allowed to settle for 35 minutes and the water layer was again drained out of the bottom. The remaining organic layer was steam distilled to remove the hexane (after 2 ¼ hours, the temperature was about 100°C. and most of the hexane had distilled off). Vacuum was applied and the temperature was increased to 175°C. over a 4 hour period to yield 220 parts of product. Two hundred eighteen parts of this product were charged to a still equipped with a large capacity vacuum pump. The product was heated slowly under vacuum for 5 ½ hours until 20 parts (approximately 10%) were obtained as a forecut (conditions were pot temperature 213°C., overhead temperature 205°C., 2.3 mm. Hg. vacuum). Distillation was continued for 4 more hours until 151 parts distillate were collected (conditions were pot temperature 236°C., overhead temperature 210°C., 1.4 mm. Hg. vacuum). Distillation was stopped at this point leaving 36 parts residue. Analysis of the main distillation cut showed that it consisted of 96% of the desired 2-hydroxy-5-nonylbenzophenone, 1.5% nonylphenol and trace amounts of other materials.

One thousand grams (3.08 mol ) of the above-prepared 2-hydroxy-5-nonylbenzophenone, 320 grams (4.61 mol) hydroxylamine hydrochloride, 416 grams (5.07 mol) sodium acetate and 400 grams absolute methanol were combined in a 5 l. round bottom flask equipped with a stirrer, thermometer and reflux condenser. The reaction mixture was heated to reflux which was continued for 31 hours. The resulting reaction mixture was poured into water, extracted with ether and the ether solution was washed with water until neutral. The ether solution was then washed with a saturated aqueous NaCl solution, dried over $Na_2SO_4$ and stripped of ether at $a$°C. (10 mm. Hg.) to yield 995.3 grams of 2-hydroxy -5-nonylbenzophenoxime.

2. Extraction of a Copper Solution with 2-Hydroxy-5-nonylbenzophenoxime

Ten milliliters of a 10% wt./vol. solution of the oxime in kerosene (10 grams oxime diluted to 100 ml. with kerosene) were placed in a 60 ml. separatory funnel. Twenty milliliters of an aqueous solution containing 4 gm./l. $Cu^{+2}$ and having a pH of 1.90 (prepared by diluting 15.7 gm. $CuSO_4.5H_2O$ to one liter with water and adjusting the pH with conc. $H_2SO_4$ ) were then added. The separatory funnel was shaken for 2 minutes at ambient room temperature and the aqueous phase was separated from the organic phase. The above procedure was repeated three more times adding fresh 20 ml. portions of the copper solution each time. The pH of the last aqueous phase separated from the organic phase was 1.89 indicating that the organic phase was substantially loaded with copper. The organic phase analyzed 4310 ppm Cu.

EXAMPLE II

1. Preparation of 2-Hydroxy-4'-(1,1-dimethylethyl)-5-(2-pentyl)-benzophenoxime 468.1 grams (2.38 mol) of p-t-butyl benzoyl chloride, 390.7 grams (2.38 mol) of p-s-amyl phenol were combined in a 2 liter flask and heated to 200°C. for 1 ½ hours. The product was cooled and was taken up in diethyl ether and washed once with water, twice with dilute NaOH and then three times with water and finally dried over sodium sulfate. Removal of the ether under vacuum gave 768 grams of a light-colored residue. The residue was then distilled to give 674 .3 grams of a water-white liquid collected at 209° to 220°C. at 50 microns pressure.

324.4 grams of the above material (1 mol), 140 grams of aluminum chloride (1.05 mol) and 400 ml. of phenyl chloride were added to a 2 liter flask equipped with a thermometer, stirrer and reflux condenser. The temperature immediately rose to 60°C. and heating was started. The mixture was refluxed for ¾ of an hour and then poured over ice. This aqueous slurry was then heated to decompose the complex. The product was then extracted with Skellysolve B and washed twice with dilute hydrochloric acid and five times with water. The solvent was stripped off under vacuum to leave a residue which was saponified by adding 132 grams KOH dissolved in 150 ml. of water, 700 ml. of isopropanol, 300 ml. of methanol, under reflux for 24 hours. The product was then poured into 12 liters of water and extracted with Skellysolve B. The product was washed three times with dilute NaOH-NaCl, four times with water, two times with dilute HCl and five times with water and then dried over sodium sulfate. The solvent was then distilled off and the residue vacuum distilled to yield 82.5 grams of product collected at 183 to 193° at 80 microns. This benzophenone was then converted to the oxime as previously described except that an excess of pyridine was used instead of sodium acetate.

2. Extraction of Copper

The liquid ion exchange circuit consisted of three stages for extraction and four stages for stripping. Provisions were made to add a base (0.25 N $Nh_3$ solution) to the first and second stage mixes for pH control. The PH's for the first aqueous stage, the second aqueous stage and the third aqueous stage (raffinate) were measured and recorded. Stripping was accomplished in four stages, using sulfuric acid solutions. The initial acid concentration was 301 grams $H_2SO_4$ per liter and the pregnant solution from stripping was reused as the stripping solution. The extractant was composed of a 5% by volume solution of the extractant in kerosene. Aqueous feed solutions were made up by dissolving copper sulfate and sodium sulfate in water and adjusting the pH to 2.1:2.2 sulfuric acid. The iron in the solution was dissolved ferric sulfate. The circuit was operated with the aqueous solution in the continuous phase to minimize short circuiting.

The extraction was conducted in the three stages with different feed rates and the results are indicated in the following table:

3 Stage Extraction, 4 Stage Stripping, Ambient Temperature = 30°C.

| Extraction | | | | |
|---|---|---|---|---|
| Hours of operation | | 7 | 15 | 14 |
| Aqueous Feed, | cc./min. | 42 | 50 | 54 |
| | g. Cu/l. | 0.98 | 1.00 | 1.02 |
| | g. Fe/l. | 1.08 | 0.50 | 0.50 |
| | pH | 2.18 | 2.23 | 2.16 |
| Aqueous pH, | 1st stage | 2.02–2.10 | 2.08–2.20 | 2.00–2.18 |
| | 2nd stage | 2.05–2.21 | 2.00–2.30 | 2.06–2.23 |
| | Raffinate | 1.98–2.06 | 1.98–2.20 | 1.96–2.16 |
| Raffinate, | g. Cu/l. | 0.08 | 0.11 | 0.15 |
| | g. Fe/l. | 1.04 | 0.49 | 0.50 |
| Organic, | cc./min. | 27.2 | 27.3 | 24.8 |
| | g. Cu/l. | 0.1 | 0.15 | 0.18 |
| | g. Fe/l. | nil | nil | nil |
| Cu Extraction, | % | 91.8 | 89.0 | 85.3 |
| Fe Extraction, | % | 3.7 | 3.0 | 0 |
| Stripping | | | | |
| Loaded Organic, | g. Cu/l. | 1.60 | 1.93 | 2.03 |
| | g. Fe/l. | 0.05 | 0.04 | 0.025 |
| Strip Solution, | cc./min. | 6.7 | 6.15 | 6.4 |
| | g. Cu/l. | 12.4 | 20.1 | 30.0 |
| | g. Fe/l. | nil | 0.18 | 0.31 |
| | g. $H_2SO_4$/l. | 287 | 277 | 264 |
| Preg. Solution | g. Cu/l. | 18.1 | 20.1 | 34.1 |
| | g. Fe/l. | 0.14 | 0.27 | 0.33 |
| | g. $H_2SO_4$/l. | 280 | 270 | 256 |

These results show that good copper extraction is obtained at all of these levels of feed. Iron extraction into the organic phase is very low and high concentrations of copper in the stripping solution can be obtained as is evident by the final result which showed 34.1 grams of copper per liter. This shows that stripping can be accomplished with a copper-saturated acid solution, thus giving copper sulfate crystals as the final product. It is thus possible to produce a solution suitable for electroplating of copper. In the final 14-hour operation, the iron extraction based on assays of the feed and raffinate was zero. The slight amount of iron shown in the loaded organic may be due to aqueous entrainment. Minor amounts of copper are shown in the raffinate but when the raffinate was contacted within an additional stage of extraction, it was found that a very high percentage of the remaining copper could be extracted. Thus, in a four-state extraction, copper recoveries of the order of 95% or better are obtainable.

EXAMPLE III

1. Preparation of 2-Hydroxy-2',4',5'-trimethyl-5-octylbenzophenoxime 266.7 grams of aluminum chloride (2 mol) and 600 ml. of carbon tetrachloride were added to a 1 liter flask equipped with a stirrer, addition funnel and a temperature controller. 120.2 grams (1 mole) of pseudocumene dissolved in 200 ml. of carbon tetrachloride was then added to the flask at 37° to 42°C. over a 1 hour period. Reaction was continued for an additional 2 hours at this temperature. The product was cautiously added to water and the temperature kept in the range of 60° to 65° by the addition of ice. Stirring was continued an additional 5 minutes and it was cooled to 30° by the addition of more ice. The product was then extracted with diethyl ether-Skellysolve B and was washed with water until neutral. It was then dried over calcium chloride overnight. The product was filtered and the filtrate was stripped of solvent to give 208.2 gm of a crude 2,4,5-trimethyl benzotrichloride having a chlorine content of 36%.

86.6 grams (0.65 mol) of aluminum chloride and 100 ml. of carbon disulfide were added to a 1 liter flask equipped with a stirrer, addition funnel and a thermometer. The mixture was cooled to 0 to 5°C. and 103.2 grams (0.5 mol) of octyl phenol was added (the octyl phenol comprised a mixture of phenols substituted in the para position with branched chain 8 carbon atom alkyl radicals about 80% of such radicals having the structure $$CH_3-\underset{\underset{CH_3}{\overset{\overset{CH_3}{|}}{|}}}{\overset{CH_3}{C}}-\underset{}{\overset{}{H}CH}-\underset{}{\overset{}{C}}-CH_3 \quad ).$$

156.2 grams of crude 2,4,5-trimethyl benzotrichloride (0.5 mol assuming 76% purity) and 100 ml. of carbon disulfide were then added over a 15 minute period at 0°C. and this temperature maintained an additional 3 hours. 200 ml. of absolute methanol was then added at 0°C. followed by 250 ml. of water. This mixture was then poured into 1 liter of water and heated to 47° and was then allowed to cool over night. The product was then extracted with diethyl ether and Skellysolve B and washed with water until neutral. It was then dried over sodium sulfate. The sodium sulfate was filtered off and the solvent distilled off. The residue was distilled to yield a fraction containing 83.3 grams of 2-hydroxy-2',4',5'-trimethyl-5-octylbenzophenone. This product was converted to the corresponding oxime by a standard method.

2. Extraction of Copper

The above oxime was then used for extracting copper from 0.049 molar copper sulfate solution. The oxime was used in the form of a solution composed of 5 grams of the oxime diluted to 100 ml. with kerosene. 10 ml. of the 0.049 molar copper sulfate solution was diluted with 10 ml. of 0.05 molar sodium bisulfate. A series of extractions were conducted in separatory funnels using 10 ml. of the extractant solution. The separatory funnels were shaken for the time periods indicated in the following table and the aqueous phase was then separated from the organic phase. The results are indicated in the following table:

|   | Time | pH | ppm Cu In organic |
|---|---|---|---|
| A | 1 min. | 2.28 | 1180 |
| B | 5 min. | 2.19 | 1820 |
| C | 10 min. | 2.18 | 1940 |
| D | 120 min. | 2.19 | 1935 |

EXAMPLE IV

2-Hydroxy-2',4'-dimethyl-5-nonylbenzophenoxime was prepared by the method described in Example III (the starting nonylphenol was the same as used in Example I). This oxime was used for extraction of copper in the following manner: 5 grams of the oxime were diluted with kerosene to 100 ml. The copper solution was composed of a mixture of equal volumes of 0.1 molar copper sulfate and 1.0 molar sodium sulfate. The mixed solution contained 3,180 ppm copper. The extractions were conducted in separatory funnels by mixing the aqueous and organic solutions and shaking them in a separatory funnel for the indicated time periods. The pH was adjusted by the addition of the indicated quantities of bicarbonate or bisulfate. The results are indicated in the following table:

EXAMPLE V

1. Preparation of 2-Hydroxy-5-dodecylbenzophenoxime

2-Hydroxy-5-dodecylbenzophenoxime was prepared by the following method: 346.7 grams (2.6 mol) of aluminum chloride and 1900 ml. of carbon disulfide were added to a 5 liter round bottom flask equipped with a stirrer, thermometer and addition funnel. The mixture was cooled to 0°C. 524.8 grams (2 mol) of dodecylphenol (available from General Analine and Film—the dodecylphenol comprised a mixture of monoalkyl phenols, predominantly para substituted, with the chains being random-branched alkyl radicals) was mixed with 100 ml. of carbon disulfide and then added at 0° to the flask. The flask was cooled to −15° to −20°. 391 grams (2 mol) of benzotrichloride was then added at temperatures of −15° to −20° over a period of 13 minutes. The flask was warmed 0° to 5° and held for 1 hour. One liter of methanol was added at 0° to 5° followed by 500 ml. of water at the same temperatures. The mixture was heated and at 25°C. steam was passed through and continued to heat until a temperature of 100°C. was reached. The mixture was then cooled and poured into dilute hydrochloride acid and extracted with diethyl ether and dried over sodium sulfate. The solvent was stripped off and the residue was stripped and a fraction of 288.7 grams of 2hydroxy 5-dodecylbenzophenone was recovered. This benzophenone was converted to the oxime by a standard method.

2. Extraction of Copper

The above benzophenoxime was used in the extraction of copper in the following manner: An aqueous copper solution which was 0.0175 molar as to copper was extracted with a solution containing 5 grams of the above benzophenoxime in 100 ml. of solution in an alkyl substituted aromatic hydrocarbon solvent. The extraction was conducted in a separatory funnel with an aqueous to organic ratio of 2 for time periods of 1, 2, 5 and 10 minutes. The results are indicated in the following table:

| Time Min. | pH | ppm Cu ORG |
|---|---|---|
| 1 | 1.74 | 104 |
| 2 | 1.72 | 236 |
| 5 | 1.71 | 335 |
| 10 | 1.68 | 550 |

EXAMPLE VI

2-Hydroxy-3,5-dinonyl benzophenoxome was prepared by the method described in Example V using 3,5-dimonylphenol (the nonyl groups were random-

|   | ml Organic | ml Cu SOL | ml .1M HCO$_3^-$ | ml .1MHSO$_4^-$ | Min. | pH | ppm Cu in Organic |
|---|---|---|---|---|---|---|---|
| A | 20 | 10 | 5 | — | 1 | 5.44 | 990 |
| B | 20 | 10 | 5 | — | 5 | 3.50 | 1160 |
| C | 20 | 10 | 5 | — | 10 | 3.12 | 1280 |
| D | 20 | 10 | 5 | — | 120 | 2.25 | 1030 |
| E | 20 | 10 | — | 5 | 1 | 5.00 | 75 |
| F | 20 | 10 | — | 5 | 5 | 2.50 | 220 |
| G | 20 | 10 | — | 5 | 10 | 2.48 | 595 |
| H | 20 | 10 | — | 5 | 120 | 2.33 | 1400 | branched alkyl radicals). Five grams of the above oxime was dissolved in an alkyl substituted aromatic hydrocarbon solvent (Panasol AN-1). It was used to extract copper from 0.035 molar copper sulfate containing 10 grams of sodium sulfate per liter. The pH of the aqueous solution was adjusted by the addition of sodium bisulfate and was further diluted with water as indicated in the following table. Extractions were carried out in separatory funnels as previously described with the following results:

|   | ml Organic | ml Cu SOL | ml 0.1M $HSO_4$ | ml $H_2O$ | Time Min. | pH | M Cu Aqueous |
|---|---|---|---|---|---|---|---|
| A | 10 | 10 | 5 | 5 | 1 | 2.01 | 0.016 |
| B | 10 | 10 | 5 | 5 | 2 | 2.04 | 0.015 |
| C | 10 | 10 | 5 | 5 | 5 | 2.00 | 0.013 |
| D | 10 | 10 | 5 | 5 | 10 | 1.99 | 0.011 |

A further important aspect of the present invention is the discovery that the combination of the benzophenoxines previously described with certain α-hydroxy aliphatic oximes results in a phenomenal improvement in the kinetics of the copper extraction. The extraction of copper values from aqueous solutions using these α-hydroxy aliphatic oximes alone is preferably conducted by high pH's above 7 because of improved yields and better selectivity with respect to iron at these pH's as compared with low pH's. The 2-hydroxy benzophenoximes of the present invention, however, are very effective at low pH's but the kinetics of the extraction at these low pH's with the 2-hydroxy benzophenoximes is not as good as it is with the α-hydroxy aliphatic oximes.

Surprisingly, however, it has been found that when the α-hydroxy aliphatic oximes are employed in combination with the 2-hydroxy benzophenoximes at low equilibrium pH's, for example, in the range of 1.4–2.3 pH's, the kinetics of the extraction are very materially improved without any serious effect on the selectivity of the extraction with respect to iron. The combination of the two reagents provides important advantages as to:

1. Preferential extraction of the copper.
2. Extraction of the copper from the aqueous solution at low pH values (copper solutions normally exist at low pH's).
3. Improved rate of copper extraction with respect to time,
4. Improved recovery from the organic phase, and
5. Greater economy.

The α-hydroxy aliphatic oxime extractants which may be used for this purpose have the folowing general formula:

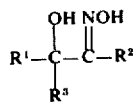

where $R^1$, $R^2$ and $R^3$ may be any of a variety of organic radicals such as aliphatic and alkylaryl radicals. $R^3$ may also be hydrogen. Preferably, $R^1$ and $R^2$ are unsaturated hydrocarbon or branched chain alkyl groups containing from about 6 to 20 carbon atoms. $R^1$ and $R^2$ are also preferably the same and when alkyl are preferably attached to the carbons substituted with the —OH and =NOH groups through a secondary carbon atom. It is also preferred that $R^3$ is hydrogen or unsaturated hydrocarbon or branched chain alkyl groups containing from about 6 to 20 carbon atoms. The α-hydroxy oximes also preferably contain a total of about 14 to 40 carbon atoms. Representative compounds are 19-hydroxyhexatriaconta-9,27-dien-18-oxime, 5,10-diethyl-8-hydroxytetradecan-7-oxime, and 5,8-diethyl-7-hydroxydodecane-6-oxime. The latter compound has the following structural formula:

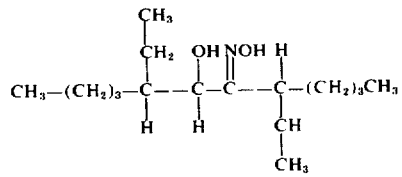

Representative of other mono- and polyunsaturated radicals are heptenyl, octenyl, decenyl, octadecenyl, octadecynyl and alkyl substituted radicals such as ethyloctadecenyl. Representative of other mono- and polyalkyl substituted saturated radicals are ethylhexyl, diethylheptyl, butyldecyl, butylhexadecyl, ethylbutyldodecyl, butylcyclohexyl and the like. The $R^1$, $R^2$ and $R^3$ groups may contain inert substituents.

The α-hydroxy oxime extractants are also characterized as having a solubility of at least about 2% by weight in the hydrocarbon solvent used to make up the organic phase and substantially complete insolubility in water. In addition, it is believed that the copper values and the α-hydroxy oxime extractant form a complex during the initial extraction step and such complex, when formed, should also have a solubility of at least about 2% by weight in the hydrocarbon solvent.

The relative amounts of the two extractants can be varied widely as examples hereinafter will demonstrate. Even minute quantities of the α-hydroxy aliphatic oxime are beneficial. However, it is preferred to employ it in the range of 1 to 100% by weight based on the weight of the 2-hydroxy benzophenoxime, with best results obtainable in the range of 15–50%. The amount of the extractants in the organic solvent likewise can vary within considerable limits. In general, however, the concentration of total oxime is in the range 2–25%, based on the weight of the organic extracting solution, preferably in the range of 5–15%.

-EXAMPLE VII

A series of extractions were conducted on an aqueous copper sulfate solution in which the copper was extracted from the aqueous solution by means of a mixed solution of 2-hydroxy 5-dodecylbenzophenoxime as prepared in Example V and 5,8-diethyl-7-hydroxy dodecane-6-oxime in an alkyl substituted aromatic hydrocarbon solvent. The concentration of the copper in the aqueous solution used as a starting material as well as the concentrations of the respective extractants and the aqueous to organic ratios together with the recovery and time of extraction are indicated in the following tables.

Table 1

| (A) % | ml Org. | $(Cu^{++})$ aq. M | ml Aq. | A/O | (B) % | pH | (Cu) org ppm | Time min. |
|---|---|---|---|---|---|---|---|---|
| 5 | 10 | 0.0175 | 20 | 2 | 5 | 1.69 | 725 | 1 |

Table 1-continued

| (A) % | ml Org. | (Cu++) aq. M | ml Aq. | A/O | (B) % | pH | (Cu) org ppm | Time min. |
|---|---|---|---|---|---|---|---|---|
| 5 | 10 | 0.0175 | 20 | 2 | 5 | 1.69 | 740 | 2 |
| 5 | 10 | 0.0175 | 20 | 2 | 5 | 1.68 | 755 | 5 |
| 5 | 10 | 0.0175 | 20 | 2 | 5 | 1.68 | 760 | 10 |
| 5 | 10 | 0.0175 | 20 | 2 | 2.5 | 1.67 | 780 | 1 |
| 5 | 10 | 0.0175 | 20 | 2 | 2.5 | 1.66 | 815 | 2 |
| 5 | 10 | 0.0175 | 20 | 2 | 2.5 | 1.67 | 860 | 5 |
| 5 | 10 | 0.0175 | 20 | 2 | 2.5 | 1.66 | 857 | 10 |
| 5 | 10 | 0.0175 | 20 | 2 | 1.0 | 1.72 | 555 | 1 |
| 5 | 10 | 0.0175 | 20 | 2 | 1.0 | 1.71 | 730 | 2 |
| 5 | 10 | 0.0175 | 20 | 2 | 1.0 | 1.69 | 895 | 5 |
| 5 | 10 | 0.0175 | 20 | 2 | 1.0 | 1.68 | 940 | 10 |
| 5 | 10 | 0.0175 | 20 | 2 | 0.5 | 1.74 | 390 | 1 |
| 5 | 10 | 0.0175 | 20 | 2 | 0.5 | 1.72 | 615 | 2 |
| 5 | 10 | 0.0175 | 20 | 2 | 0.5 | 1.70 | 855 | 5 |
| 5 | 10 | 0.0175 | 20 | 2 | 0.5 | 1.68 | 945 | 10 |
| 5 | 10 | 0.0175 | 20 | 2 | 0.1 | 1.74 | 165 | 1 |
| 5 | 10 | 0.0175 | 20 | 2 | 0.1 | 1.73 | 321 | 2 |
| 5 | 10 | 0.0175 | 20 | 2 | 0.1 | 1.71 | 520 | 5 |
| 5 | 10 | 0.0175 | 20 | 2 | 0.1 | 1.69 | 853 | 10 |
| 5 | 10 | 0.0175 | 20 | 2 | None | 1.74 | 104 | 1 |
| 5 | 10 | 0.0175 | 20 | 2 | None | 1.72 | 236 | 2 |
| 5 | 10 | 0.0175 | 20 | 2 | None | 1.71 | 335 | 5 |
| 5 | 10 | 0.0175 | 20 | 2 | None | 1.68 | 550 | 10 |

Note:
A = 2-hydroxy 5-dodecylbenzophenoxime
B = 5,8-diethyl-7-hydroxy dodecane-6-oxime Table 2

| (A) % | ml Org. | (Cu++) aq. M | ml Aq. | A/O | (B) % | pH | (Cu) org ppm | Time Min. |
|---|---|---|---|---|---|---|---|---|
| 5 | 10 | 0.016 | 20 | 2 | 2.5 | 1.77 | 645 | 0.5 |
| 5 | 10 | 0.016 | 20 | 2 | 2.0 | 1.78 | 615 | 0.5 |
| 5 | 10 | 0.016 | 20 | 2 | 1.5 | 1.79 | 565 | 0.5 |
| 5 | 10 | 0.016 | 20 | 2 | 1.0 | 1.80 | 460 | 0.5 |
| 5 | 10 | 0.016 | 20 | 2 | 2.5 | 1.78 | 765 | 1.0 |
| 5 | 10 | 0.016 | 20 | 2 | 2.0 | 1.79 | 750 | 1.0 |
| 5 | 10 | 0.016 | 20 | 2 | 1.5 | 1.79 | 700 | 1.0 |
| 5 | 10 | 0.016 | 20 | 2 | 1.0 | 1.80 | 670 | 1.0 |
| 5 | 10 | 0.016 | 20 | 2 | 2.5 | 1.77 | 815 | 2.0 |
| 5 | 10 | 0.016 | 20 | 2 | 2.0 | 1.79 | 825 | 2.0 |
| 5 | 10 | 0.016 | 20 | 2 | 1.5 | 1.75 | 825 | 2.0 |
| 5 | 10 | 0.016 | 20 | 2 | 1.0 | 1.80 | 810 | 2.0 |
| 5 | 10 | 0.016 | 20 | 2 | 2.5 | 1.75 | 850 | 5.0 |
| 5 | 10 | 0.016 | 20 | 2 | 2.0 | 1.80 | 880 | 5.0 |
| 5 | 10 | 0.016 | 20 | 2 | 1.5 | 1.80 | 855 | 5.0 |
| 5 | 10 | 0.016 | 20 | 2 | 1.0 | 1.80 | 880 | 5.0 |

Note:
A = 2-hydroxy 5-dodecylbenzophenoxime
B = 5,8-diethyl-7-hydroxy dodecane-6-oxime Table 3

| (A) % | ml. Org. | (Cu++) aq. M | ml. Aq. | A/O | (B) % | pH | (Cu) org ppm | Time Min. |
|---|---|---|---|---|---|---|---|---|
| 10 | 10 | 0.031 | 20 | 2 | 10 | 1.65 | 2080 | 1.0 |
| 10 | 10 | 0.031 | 20 | 2 | 5 | 1.66 | 2200 | 1.0 |
| 10 | 10 | 0.031 | 20 | 2 | 2.5 | 1.64 | 2170 | 1.0 |
| 10 | 10 | 0.031 | 20 | 2 | 1.0 | 1.69 | 1830 | 1.0 |
| 10 | 10 | 0.031 | 20 | 2 | 10 | 1.70 | 2080 | 2.0 |
| 10 | 10 | 0.031 | 20 | 2 | 5 | 1.62 | 2170 | 2.0 |
| 10 | 10 | 0.031 | 20 | 2 | 2.5 | 1.62 | 2290 | 2.0 |
| 10 | 10 | 0.031 | 20 | 2 | 1.0 | 1.63 | 2170 | 2.0 |
| 10 | 10 | 0.031 | 20 | 2 | 10 | 1.70 | 2120 | 5.0 |
| 10 | 10 | 0.031 | 20 | 2 | 5 | 1.65 | 2260 | 5.0 |
| 10 | 10 | 0.031 | 20 | 2 | 2.5 | 1.65 | 2380 | 5.0 |
| 10 | 10 | 0.031 | 20 | 2 | 1.0 | 1.65 | 2380 | 5.0 |
| 10 | 10 | 0.031 | 20 | 2 | 10 | 1.70 | 2200 | 10 |
| 10 | 10 | 0.031 | 20 | 2 | 5 | 1.65 | 2260 | 10 |
| 10 | 10 | 0.031 | 20 | 2 | 2.5 | 1.65 | 2400 | 10 |
| 10 | 10 | 0.031 | 20 | 2 | 1.0 | 1.65 | 2450 | 10 |

Note:
A = 2-hydroxy 5-dodecylbenzophenoxime
B = 5,8-diethyl-7-hydroxy dodecane-6-oxime Table 4

| (A) % | ml Org. | (Cu++) aq. M | ml. Aq. | A/O | (B) % | pH | (Cu) org ppm | Time Min. |
|---|---|---|---|---|---|---|---|---|
| 2.5 | 10 | 0.016 | 20 | 2 | 2.5 | 1.70 | 425 | 1.0 |
| 2.5 | 10 | 0.016 | 20 | 2 | 1.0 | 1.71 | 415 | 1.0 |
| 2.5 | 10 | 0.016 | 20 | 2 | 0.5 | 1.70 | 310 | 1.0 |
| 2.5 | 10 | 0.016 | 20 | 2 | 0.25 | 1.70 | 240 | 1.0 |
| 2.5 | 10 | 0.016 | 20 | 2 | 2.5 | 1.69 | 445 | 2.0 |
| 2.5 | 10 | 0.016 | 20 | 2 | 1.0 | 1.68 | 475 | 2.0 |
| 2.5 | 10 | 0.016 | 20 | 2 | 0.5 | 1.68 | 445 | 2.0 |
| 2.5 | 10 | 0.016 | 20 | 2 | 0.25 | 1.68 | 374 | 2.0 |
| 2.5 | 10 | 0.016 | 20 | 2 | 2.5 | 1.70 | 435 | 5.0 |
| 2.5 | 10 | 0.016 | 20 | 2 | 1.0 | 1.71 | 470 | 5.0 |
| 2.5 | 10 | 0.016 | 20 | 2 | 0.5 | 1.70 | 485 | 5.0 |
| 2.5 | 10 | 0.016 | 20 | 2 | 0.25 | 1.70 | 465 | 5.0 |
| 2.5 | 10 | 0.016 | 20 | 2 | 2.5 | 1.70 | 450 | 10 |
| 2.5 | 10 | 0.016 | 20 | 2 | 1.0 | 1.70 | 490 | 10 |
| 2.5 | 10 | 0.016 | 20 | 2 | 0.5 | 1.70 | 525 | 10 |
| 2.5 | 10 | 0.016 | 20 | 2 | 0.25 | 1.70 | 525 | 10 |

Note:
A = 2-hydroxy 5-dodecylbenzophenoxime
B = 5,8-diethyl-7-hydroxy dodecane-6-oxime These tables show that the combination of the two extractants enhances the rate of extraction. They likewise show that good extraction can be achieved in 5 minutes or less. They further show that considerable variations in the concentrations of the reagents may be used as well as considerable variation in the relative ratios of the reagent.

While the above description has been with particular reference to specific examples, it is to be understood that the invention is not restricted thereto but may be varied within the scope of the appended claims.

Now, therefore, I claim:

1. A compound having the formula:

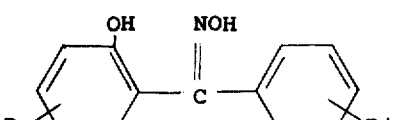

in which R and R' may be individually alike or different and are saturated aliphatic hydrocarbon groups of 1–25 carbon atoms, $m$ and $n$ are 0, 1, 2, 3 or 4 with the proviso that both are not 0 and the total number of carbon atoms in $R_m$ and $R'_n$ is from 3–25, said compound being further characterized as being substantially insoluble in water, having a solubility of at least 2% by weight in benzene and forming a complex with copper which complex is also soluble to the extent of at least 2% by weight in benzene.

2. A compound according to claim 1 in which an R group is in the 5 position, said R group containing at least nine carbon atoms.

3. A compound according to claim 2 in which the R group in the 5 position is a branched chain aliphatic hydrocarbon group.

4. A compound according to claim 1 in which both *m* and *n* are at least 1.

5. A compound according to claim 1 in which R is a branched chain aliphatic hydrocarbon group.

6. A compound according to claim 5 in which at least one R group is in the 5 position.

7. A compound according to claim 1 in which the position ortho to the phenolic hydroxyl carbon atom is unsubstituted, and in which the positions ortho to the oxime carbon of the non-phenolic ring are unsubstituted.

8. 2-Hydroxy-3'-methyl-5-ethyl-benzophenoxime.

9. 2-Hydroxy-5-dodecylbenzophenoxime.

10. 2-Hydroxy-3,5-dinonylbenzophenoxime.

11. 2-Hydroxy-4'-(1,1-dimethylethyl)-5-(2-pentyl)-benzophenoxime.

12. 2-Hydroxy-5-nonylbenzophenoxime.

13. 2-Hydroxy-2',4',5'-trimethyl-5-octylbenzophenoxime.

14. 2-Hydroxy-2',4'-dimethyl-5-nonylbenzophenoxime.

* * * * *

UNITED STATES PATENT OFFICE
CERTIFICATE OF CORRECTION

PATENT NO. : 3,925,472
DATED : December 9, 1975
INVENTOR(S) : Ronald R. Swanson

It is certified that error appears in the above-identified patent and that said Letters Patent are hereby corrected as shown below:

Col. 1, lines 28 and 29, "phenolid" should read ---phenolic---.
Col. 2, line 66 of the formula,

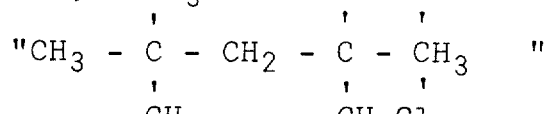

should read

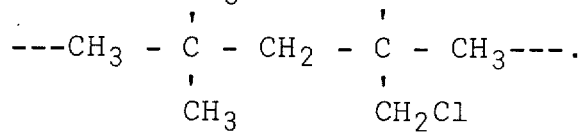

Col. 6, line 5, "α°C." should read -- 60° C. --. Col. 7, line 7, "PH's" should read ---pH's---; line 38 of the table, "0.1" should read ---0.15---; line 41 of the table, "3.0" should read ---1.0---; line 67, "four-state" should read ---four stage ---. Col. 10, line 28, "2hydroxy" should read ---2-hydroxy---; line 54, "dimonylphenol" should read ---dinonylphenol---. Col. 12, line 17 of the formula,

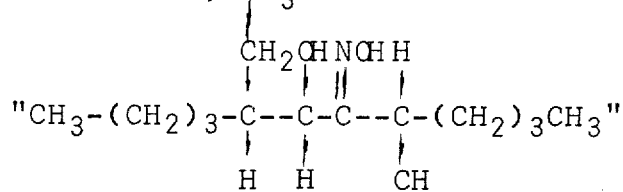

should read

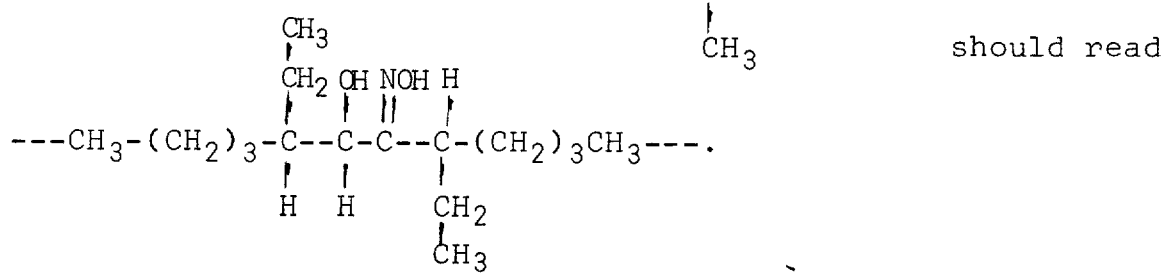

Signed and Sealed this thirteenth Day of April 1976

[SEAL]

Attest:

RUTH C. MASON
*Attesting Officer*

C. MARSHALL DANN
*Commissioner of Patents and Trademarks*